(12) United States Patent
Friedman

(10) Patent No.: US 12,518,043 B2
(45) Date of Patent: Jan. 6, 2026

(54) SYSTEM SUPPORTING OPERATIONS ON SECURELY COMMINGLING SELF-GOVERNING DATA SETS FROM A PLURALITY OF PUBLISHERS

(71) Applicant: Randy Friedman, Alameda, CA (US)

(72) Inventor: Randy Friedman, Alameda, CA (US)

(*) Notice: Subject to any disclaimer, the term of this patent is extended or adjusted under 35 U.S.C. 154(b) by 61 days.

(21) Appl. No.: 18/649,820

(22) Filed: Apr. 29, 2024

(65) Prior Publication Data

US 2024/0289479 A1    Aug. 29, 2024

Related U.S. Application Data

(63) Continuation of application No. 17/480,081, filed on Sep. 20, 2021, now Pat. No. 11,972,006, which is a continuation of application No. 16/244,098, filed on Jan. 9, 2019, now Pat. No. 11,126,737.

(60) Provisional application No. 62/615,361, filed on Jan. 9, 2018.

(51) Int. Cl.
*H04L 29/06* (2006.01)
*G06F 21/60* (2013.01)
*G06F 21/62* (2013.01)

(52) U.S. Cl.
CPC ........ *G06F 21/6218* (2013.01); *G06F 21/604* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 10,579,822 B1 * | 3/2020 | Gulsen | G06F 21/6245 |
| 2016/0012240 A1 * | 1/2016 | Smith | H04L 63/20 |
| | | | 726/1 |
| 2018/0218171 A1 * | 8/2018 | Bellala | G06F 21/6254 |

* cited by examiner

*Primary Examiner* — Jason K Gee
(74) *Attorney, Agent, or Firm* — Bryan Fibel

(57) ABSTRACT

A system supporting operations on securely commingling Self-Governing data sets from a plurality of Publishers is provided. Such a system performs storing, organizing and commingling Self-Governing data tuples that contain at least a data element cell value, a Publishers assigned Self-Governing data security element value, a unique identifier of the Publisher, and a datetime stamp, blocking direct user access to any Self-Governing data or Analytic Services during and after deposit into the system, blocking direct view of or access to any data cell in ways which violate cell-level Need-to-Know policies contained for every data element in every Self-Governing Data set, executing Analytics Services operations on the commingled data without exposing any data cell to any system user, separating access to results of the Analytic Services from the commingled Self-Governing data sets based on their Zero-Trust Self-Governing visibility policies immutably and persistently applied to the Self-Governing data at the data cell level.

20 Claims, 7 Drawing Sheets

| Record ID | 6561312 | 6561312 |
|---|---|---|
| MRN | 1285911 | 1285911 |
| Patient Last | Jones | Jones |
| Patient First | Roger | Roger |
| DOB | 01-21-1945 | 01-21-1945 |
| Facility_ID | Beachnut | Beachnut |
| Service_Date_Time | 2017-01-01T00:00:00Z | 2017-01-01T00:00:00Z |
| Test_ID | H_A1C | HIV_1 |
| Test_Name | Hemoglobin A1c | HIV1 Antibodies |
| Value | 5.3 | None_Detected |

704 →

| Publisher_ID[ALL] | Patient_Last[RES_2] | Patient_First[DOB[RES_2] | Facility_ID[ALL] | Service_Date_Time[ALL] | Test_Name[ALL] |
|---|---|---|---|---|---|
| 8861188 | Jones | Roger | 01-21-1945 | Pub_1245_Beachnut | 2017-01-01T00:00:00Z | Hemoglobin A1c |
| 8861188 | Jones | Roger | 01-21-1945 | Pub_1245_Beachnut | 2017-01-01T00:00:00Z | HIV1 Antibodies |

706 →

| Record_ID[ALL] | Facility_ID[ALL] | Service_Date_Time[ALL] | Test_ID[ALL] | Value |
|---|---|---|---|---|
| 8861188 | Pub_1245_Beachnut | 2017-01-01T00:00:00Z | H_A1C | 5.5 |
| 8861188 | Pub_1245_Beachnut | 2017-01-01T00:00:00Z | HIV_1 | None_Detected[RES_3] |

708 →

| Family | Key | Columns | Qualifier | TimeStamp | Visibility |
|---|---|---|---|---|---|
| Row ID | | | | | |

710 →

| Row ID | Lab Values | Lab Values | H_A1C | HIV_1 | RES_2 | RES_3 | | | |
|---|---|---|---|---|---|---|---|---|---|
| Pub_1245_Beachnut_MRN_1285911 | | | | | | | 1500700100 | 1500700100 | 5.21 |
| Pub_1245_Beachnut_MRN_1285911 | | | | | RES_3 | | | | None_Detected |

SYSTEM SUPPORTING OPERATIONS ON SECURELY COMMINGLING SELF-GOVERNING DATA SETS FROM A PLURALITY OF PUBLISHERS

CROSS REFERENCE TO RELATED APPLICATIONS

This application is a Continuation that claims priority from a non provisional U.S. patent application Ser. No. 17/480,081 filed on Sep. 20, 2021. Application is a Continuation Ser. No. 17/480,081 that claims priority from a non-provisional U.S. patent application Ser. No. 16/244,098 filed on Jan. 9, 2019. Application Ser. No. 16/244,098 is a non-provisional that claims priority from a provisional U.S. patent application No. 62/615,361 filed on Jan. 9, 2018.

FIELD OF THE INVENTION

Embodiments of the invention generation relate to access, organization and analysis of large quantities of data. Specifically, embodiments of the intention relate to securely share and commingled raw, often sensitive or regulated, data published by systems located within and among unrelated organizations though decentralized system mechanisms that allow data Publishers to embed their own granular data access controls directly into data elements before and during and after publishing in order to govern approved use and prevents misusage of published data.

BACKGROUND

Businesses are more interconnected than ever before and the types of goods and services they produce increasingly rely upon the real time, direct and open consumption of data. The volume of data is exploding exponentially as more devices are connected to global networks. Data analytics provide insights and event triggers that are vital to business operations in nearly every industry. While the volume of data scales, traditional analytic processes that are manual, and asynchronous do not.

"Big Data" is the term used for a collection of data sets so large and complex that it becomes difficult to process (e.g., capture, store, search, transfer, analyze, visualize, etc.) using on-hand database management tools or traditional data processing applications. Such data sets, typically on the order of terabytes and petabytes, are generated by many different types of processes. Apache Hadoop™ is a widely-adopted Big Data solution that enables the distributed processing of Big Data across clusters of computers using simple programming models. It is designed to scale up from single servers to thousands of machines, each offering local computation and storage. The Hadoop Distributed File System (HDFS) is a module within the larger Hadoop project and provides high-throughput access to application data. HDFS has become a mainstream solution for thousands of organizations that use it as a warehouse for very large amounts of unstructured and semi-structured data. However, the principal application of such Big Data deployments are focused exclusively storing, organizing and analyzing internally generated data, otherwise known as 1st Party Data. Most experts believe there are distinct opportunities for operational improvement from such analytics, and the term Digital Transformation reflects the application of analytic data driven processes to further such improvements.

Increasingly, however, competitive success is in great part be based on the organizational capacity to acquire additional data sources to improve the accuracy and timeliness of analytic driven process, where 1st Party Data is insufficient to address the aforementioned challenges and opportunities. As such, growing pressure mounts for organizations to blend their 1st Party data with 2nd Party Data, which is the first party data produced by other organizations. Analytics are known to be best applied to raw data, within which granular data elements are analyzed to reveal insights and trigger events for automated activities and workflows. Blending and analyzing the combination of 1st and 2nd Party Data dramatically improves the signal strength and accuracy of such analytics, and are also required for highly accurate automated decision making and event triggers generated machine learning (ML) and artificial intelligence (AI) or other permitted data usage processes. In addition, blending and analyzing 1st Party data with 2nd Party Data that is considered statistically orthogonal to the 1st Party data, that is to say statistically independent, is imperative to reveal unseen patterns of activity that unlock value or represent risks. Much in the same way that triangulation uses many points to locate an activity or pattern, orthogonal data is of highly rich value to data scientists tasked with detecting such patterns.

The key operational challenge there is access to 2nd Party Data, in its raw form, so that the aforementioned blending and combinatorial analytics (via manual or ML or AI methods) can be performed. The root issue being the prevention of misuse of data that is so commingled by the 1st Party. Legal agreements are not efficacious to prevent misuse, instead better suited to describing the penalties for misuse. Further, as the volume of data explodes, automated methods by which 1st and 2nd Party data can be securely blended together for combinatorial analytics will be required.

With competitive advantages accruing to those capable making their 1st Party Data open and available to internal and external partners for combinatorial analytics of 1st and 2nd Party Data, including orthogonal data, three key trends are emerging. First, predictive insight and event trigger accuracy and range can only be increased by adding additional raw data sets to those internally generated by any organization. Second, addressing the accelerating velocity and variety of data, analytics are becoming automated by machine learning and artificial intelligence. Third, organizations will need to form new ad-hoc data supply chains by which raw data is contributed by many organizations for collaborative applications that provide mutual benefit or through a process of data monetization by which data partners are provided monetary incentive to securely share data for a purpose beneficial to just one organization. New methods are required to allow organizations to find matching data partners and securely engage each in a data sharing process that prevents misuse of shared data.

To perform combinatorial analytics, it is required to organize, combine, fuse, commingle and process data from many sources. To prevent misuse of any data provided by a contributing party—or Publisher—each Publisher must be able to directly define and enforce the rules governing by whom and in what ways their raw data may be used. This also requires that no other party can override or alter the aforementioned Publisher-defined data security and governance rules or the underlying data values being contributed. The consumers of the results of combinatorial analytics—or Subscribers—must be able to access those results at increasingly rapid speeds in order for those results to be considered valid and useful for real time engagements, processes or activities.

Two simple examples demonstrate this point. Consider the challenge of maintaining productive capacity in factories plants and other industrial settings. The advent of connected devices, commonly referred to as the Internet of Things (IOT), provides Big Data with great rich value to predict events. Predictive analytics, which can be enhanced by ML, is now widely deployed in industrial settings to predict equipment failures by detecting various modes of such failure and the attributes of those modes. Few if any industrial organizations process sufficient 1st Party data from IOT devices to generate predictive models with greater than 70% accuracy, simply because their 1st Party data lacks the range and scope of potential failure modes. Combinatorial analytics addresses this deficiency and delivers predictive models with greater than 90% accuracy, which produces substantial operational advantages.

An analogous case can be easily seen in the realm of consumer finance. Fraud is a huge risk factor for consumer lending institutions, and very valuable to prevent. Predictive analytics using only 1st Party Data generates often inaccurate results. Combinatorial analytics—in particular that which utilizes orthogonal data—addresses this deficiency and delivers highly accurate predictive models which also produces substantial operational advantages.

A third case involves improving patient health outcomes, which involves analytics to determine treatment options and predicted outcomes for each patient. Whereas any one hospital (Hospital X) may have only a limited amount of information about each patient, and other patients which are similar physiologically, analytics using only Hospital X's 1st Party Data generates often insufficient accuracy. Combinatorial analytics of data within the medical record systems of hundreds of hospitals and facilities addresses this deficiency and delivers highly accurate predictive models which also produces substantial improvements in patient outcomes.

In each cases there are very large volumes of sensitive, often regulated data streaming from Publishers, accurate analytic results require securely combining and commingling the data in near real time for said analytics, where the results derived from the combined and commingled data are more valuable when available to Subscribers at similar speeds.

The process of securely sharing and commingling data from multiple Publishers cannot be performed with conventional databases and data systems in a manner that enables and mandates that each Publisher be able to directly define and enforce the rules governing by whom and in what ways by which their raw data may be is used, and which prevents any other party from overriding, extracting or altering the aforementioned Publisher-defined data security and governance rules or the underlying data values being contributed. Conventional databases, including MySQL and NoSQL types, have various capabilities to control access to data by users, however that access control is executed by one or many trusted-users, commonly called system administrators. System administrators have unrestricted access to the data store, and the ability to define or change fine-grained security controls that govern the visibility of a data value element that may be in violation of rules defined by a Publisher. While NoSQL databases provide scalable and reliable mechanisms for storing, securing, and querying Big Data organized or generated by a single business unit, they are ill suited to data sharing. Conventional usage of NoSQL and other databases, and files systems like HDFS do not prevent centralized control over data, and do not provide decentralized methods to prevent misuse of data when shared by a plurality of Publishers. Conventional data systems and databases cannot be natively configured to enable each Publisher the ability to independently define the granular access rules that govern by whom, when and for what purpose usage or analytics are performed. Sharing sensitive or regulated data elements within and across organizations in a trustless manner—meaning the owner of any one data set is not mandated to trust the administrator of the system storing such data will define and enforce that Publisher's usage rules and access rights and not override or violate those rules—is not possible using conventional NoSQL or other databases that rely on centralized controls. Data sharing cannot be securely performed if any system or database with an architecture that enables a system administrator or user with rights to alter or override any Publisher's granular security, governance or access protocols.

Achieving the requirements for the cited trends and illustrative use cases involves a system of decentralized services that commingle raw sensitive data for productive use, such as analytics, in a manner that does not expose data to those users performing the analysis in any manner that violates each Publishers rules while simultaneously empowering each Publisher to control how those analytics use the shared combined, and commingled data from multiple Publishers. In short, the requirement is that each Publisher must control how, by whom, and in what context their data can be used, even when that data is combined with data from other Publishers, while at the same time preventing any unauthorized misuse, extraction, replication or modification of that data. Homomorphic encryption (HE) is a form of encryption that allows computation on ciphertexts, generating an encrypted result which, when decrypted, matches the result of the operations as if they had been performed on the plaintext. Homomorphic encryption can be used to analyze but not expose sensitive data, however fully homomorphic encryption schemes allow arbitrary computation on encrypted data, and no means by which any one Publisher of such data can control what analytics are being performed and in what context their data is being used. As such homomorphic encryption may be useful, but on its own does not address the set of requirements.

The cited trends and illustrative use cases present a pressing need for decentralized methodologies, products and processes by which organizations can collaborate using their raw data resources in a manner that allows each Publisher of data a fully decentralized process to define, embed and enforce fine-grained control over how and by whom and in what context each data element can be used when it is virtually or physically commingled to achieve these aims. The advent of distributed ledger technology (DLT), which is a virtualized database that is spread across several nodes or computing devices, wherein each node replicates and saves an identical copy of the ledger, and wherein each participant node of the network updates itself independently is also insufficient to meet the cited needs in the illustrative use cases. While distributed ledger technology are not maintained by any central authority, and there is no means by which any one party can override the data or metadata to that data without detection and rejection, distributed ledger technology does not, on its own, enable the use of data for analytics without exposing such data in the process. In most cases, data must be removed from the ledger and placed in a repository for analytics. As such DLT may be useful, but on its own does not address the set of requirements.

Homomorphic encryption (HE) and distributed ledger technology (DLT) can be and have been combined to provide a means to share sensitive data, however that sharing is still based on some element of trust. Natively configured HE and DLT when combined can control who may use data, and hide sensitive data during analytic processing but there is no means by which any one Publisher of such data can control what analytics are being performed and in what context their data is being used. As such DLT and HE in combination may be useful, but even when HE and DLT is combined its own does not address the set of requirements.

Organizations in myriad commercial, industrial and governmental sectors require decentralized methodologies, products and processes to directly collaborate using their raw data resources in a manner that allows each Publisher of data a fully decentralized process to define, embed and enforce fine-grained control over how and by whom and in what context each data element can be used when it is virtually or physically commingled to achieve these aims without exposing data in unauthorized ways during such processes. This disclosure addresses these needs.

BRIEF SUMMARY OF THE INVENTION

The present invention comprises a novel combination of software technologies and data security architectures that enable a multitude of unrelated organizations to directly collaborate in a manner whereby each can separately publish "Self-Governing" data sets which are virtually or physically commingled to enable, often in near real time, analytic, machine learning and artificial intelligence (AI) or other permitted data usage processes without directly exposing the raw combined data to users in the process of addressing pressing operational challenges which are otherwise unaddressable using only the internally generated 1st Party Data of any one organization. In preferred embodiments, the present invention is provided as a system that enables combinatorial analytics, machine learning or artificial intelligence (AI) or other permitted data usage processes applied to commingled data first deposited by a plurality of Publishers each of which separately define, embed and enforce granular security policies on each data element (typically, a cell, or collection of cells) to be ensured that data cannot be misused. In other embodiments, the present invention is provided as a service that perform the very same functions with the participants each performing roles that in aggregate enable the formation of a marketplace for data monetization and subscription to perform combinatorial analytics, machine learning or artificial intelligence (AI) or other permitted data usage processes applied to commingled data without exposing the Self-Governing data in any manner contravening the embedded and enforced fine-grained security and governance settings which control how and by whom and in what context each data element can be used.

A system supporting operations on securely commingling Self-Governing data sets from a plurality of Publishers is provided. It comprises at least one processor, the at least one processor configured to cause the system to perform storing, organizing and commingling Self-Governing data tuples that contain at least a data element cell value, a Publishers assigned Self-Governing data security element value, a unique identifier of the Publisher, and a datetime stamp, blocking direct user access to any Self-Governing data or Analytic Services during and after deposit into the system, blocking direct view of or access to any data cell in ways which violate cell-level Need-to-Know policies contained for every data element in every Self-Governing Data set, executing Analytics Services operations on the commingled data without exposing any data cell to any system user, separating access to results of the Analytic Services from the commingled Self-Governing data sets based on their Zero-Trust Self-Governing visibility policies immutably and persistently applied to the Self-Governing data at the data cell level.

The system can include defining and managing specific Self-Governing Data schemas and inspection services that Publishers can utilize to securely deposit Self-Governing data. The system can include validating that Self-Governing Data sets match at least one Self-Governing Data schema. The system can include providing to Service Providers the use of developer tools to create and test Analytic Services using Publisher provided sample or synthetic Self-Governing data that matches one or more Self-Governing Data Schemas. The system can include allowing Service Providers to submit Analytic Services for Publisher inspection and approval to use Publisher's Self-Governing data subject to the Zero-Trust data security element value each Publisher applied to each data value in each tuple. The system can include creating and providing user credentials for all non-administrative system users. The system can include defining and managing a catalog of Self-Governing Data schemas. The system can include logging and analyzing usage of data owned by each Publisher needed to deliver the results of the Analytic Services to Subscribers. The system can include resetting or deleting environment data and logs. The system can include enforcing access rules to the sample or synthetic data contained within an Analytic Sandbox.

BRIEF DESCRIPTION OF THE DRAWINGS

For a more complete understanding of the subject matter and the advantages thereof, reference is now made to the following descriptions taken in conjunction with the accompanying drawings, understanding that some embodiments of the present invention are illustrated as an example and are not limited by the figures of the accompanying drawings, in which like references may indicate similar elements.

FIG. 7 depicts an illustrative example how a Publisher can define and embed granular security policies on each data element and enforces those assignments.

DETAILED DESCRIPTION OF THE INVENTION

Figure 1:
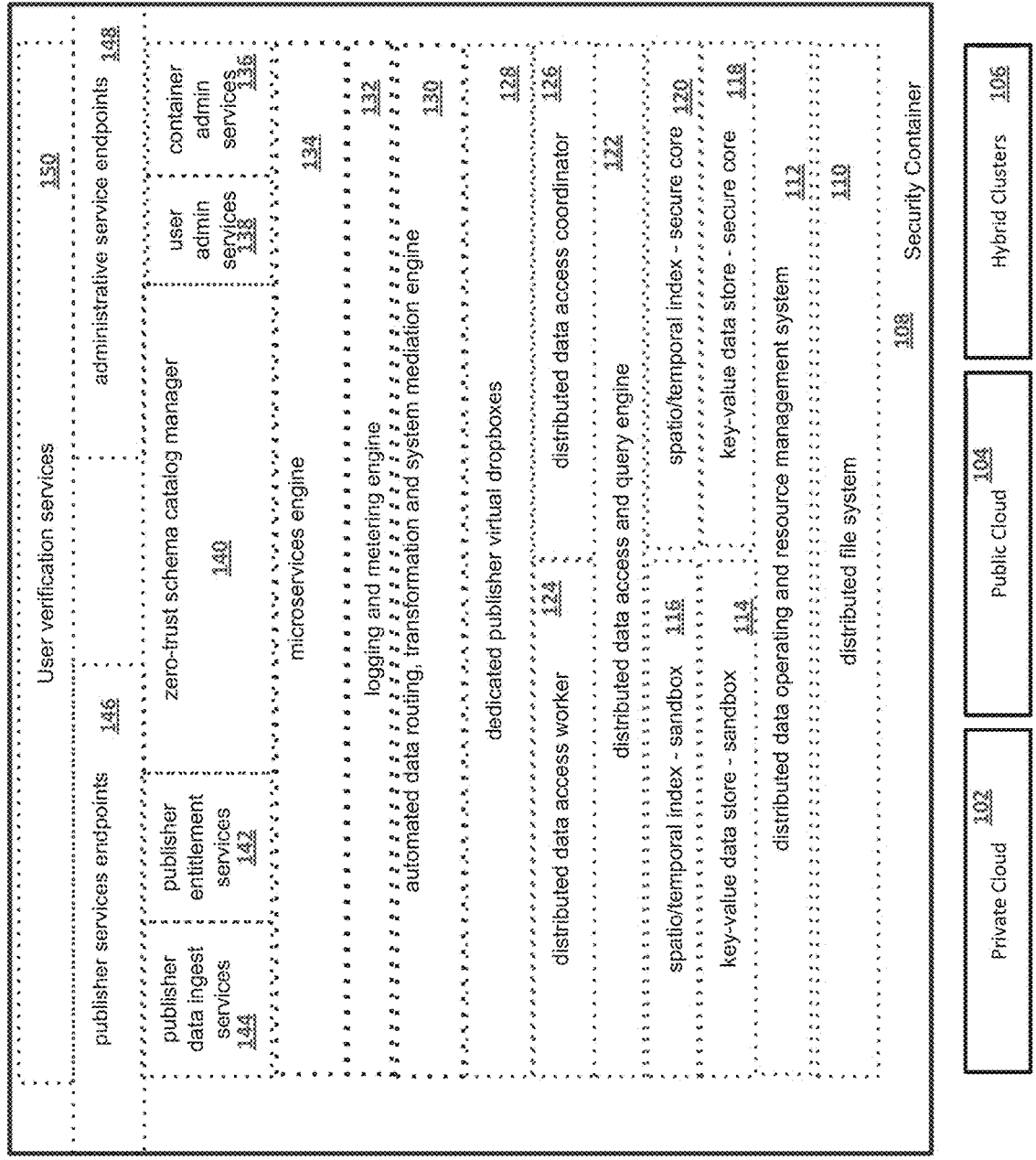
FIG. 1 depicts a first software technology architecture to enable a multitude of unrelated organizations to directly collaborate in a manner whereby each can separately publish "Self-Governing" data sets which are physically commingled for secure analytic, machine learning and artificial intelligence (AI) or other permitted data usage processes, wherein a set of decentralized services enable a plurality of Publishers to separately and simultaneously define, embed and enforce granular security policies on each data element, to each effect control over how and by whom and in what context each data element can be used in such a way as to make the resultant data "Self-Governing."

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

It will be understood that no limitation of the scope is thereby intended, such alterations and further modifications in the illustrated invention, and such further applications of the principles as illustrated therein being contemplated as would normally occur to one skilled in the art to which the embodiments relate. The present disclosure is to be considered as an exemplification of the invention, and is not intended to limit the invention to the specific embodiments illustrated by the figures or description below.

The following description includes information that may be useful in understanding the present invention. It is not an admission that any of the information provided herein is prior art or relevant to the presently claimed invention, or that any publication specifically or implicitly referenced is prior art.

Various embodiments of the inventive subject matter provide a framework, apparatus, systems, methods and software products for the secure Zero-Trust sharing, commingling, and combinatorial analysis of multiple data sets from any of a plurality of Publishers to any of a plurality of Subscribers. The invention is organized in such a manner as to prevent any user, including, but not limited to, administrative users of the system, database administrators, administrators of the underlying file systems or system administrators of the underlying linux clusters, cloud servers and data center administrators, from directly accessing the data published within the system in any fashion. The invention is organized in such a manner as to also prevent any user from indirectly accessing the data published within the system, which is exclusively performed via preconfigured Zero-Trust microservices, in any manner that violates the embedded fine-grained data usage and access controls which are applied via Self-Governing data security mechanism. The Self-Governing data security mechanism uses each Zero-Trust data sharing schema's default need-to-know fine grained control values, or Publishers' overrides to those defaults, to determine how and by whom and in what context each data element (a cell of data) can be used when it is virtually or physically commingled. Self-Governing data security mechanism applies each Publisher's need-to-know fine grained control values simultaneously in a manner that is both persistent and immutable, to enable the aforementioned analytics, machine learning and artificial intelligence (AI) or other permitted data usage processes on the commingled data without exposing the data in unauthorized ways or enabling any party to extract data directly from the invention.

Various embodiments of the inventive subject matter refer to the Self-Governing data security mechanism, which a process which transforms raw source data residing within an information system or database into new Self-Governing key-value tuples organized in tables or in other means within a key-value store, be it on physical media or in-memory or in a containerized virtual appliance. Self-Governing key-value tuples contains at minimum the unique identifier of its owner, the Publisher in the present inventive subject matter, the original cellular data value from the source system or database in its original format, its corresponding Self-Governing data security element value inherited from the Zero-Trust data sharing schema through which the original data was transformatively processed, and the datetime of the creation of the tuple. All values within the Self-Governing key-value tuples are immutable once defined, and persistent during subsequent transformations within the context of the inventive subject matter. The Self-Governing data security element value functions to control the "need-to-know" the cellular data value within the Self-Governing key-value tuples, which enables Zero-Trust cyber security principles to be applied at the cellular level of data in the present inventive matter. The Self-Governing data security mechanism, through the generation of Self-Governing key-value tuples enable the sharing and commingling of sensitive data, by a plurality of Publishers, where each Publisher retains sole control over how and by whom and in what context each cell of data within every share data set can be used. This further enables Self-Governing key-value tuples to be subjected to analysis, supervised and unsupervised machine learning, deep learning neural network processes and other usage patterns, when properly secured within a Zero-Trust containerized key-value store, in a manner that prevents direct access, viewing and extraction of Self-Governing key-value tuples. The Self-Governing data security mechanism also prevents any user or automated process to indirectly expose or extract the data values within each Self-Governing key-value tuples in any manner contrary to each Publishers' grant of need-to-know entitlements required by any user or process to indirectly access or make use of the Self-Governing key-value tuples. The Zero-Trust cybersecurity principles underlying the Self-Governing key-value tuples rigorously implement the required conditions for that secure data sharing requires that no one be trusted with data access, trust should never be assumed, entitlement to data for usage must be indirect, permission based, separated for the user requesting access to the data for productive use, and the application process or analytic job they generate from that productive use that will also make use of the shared commingled data, all of which is subjected to a need-to-know policy immutably defined by the owner of the data that is not based on roles, status or proximity to the data store.

The present invention addresses requirement for secure data sharing and commingling needed for a wide variety of data driven processes, automation, and analytics. The process of data sharing using the present invention begins with an agreement by all stakeholders on three topics: what data-value-elements must be shared, how that shared data must be formatted, and how each data element must be protected from misuse by default. The Self-Governing data security mechanism of the present invention uses Zero-Trust data sharing schemas to address all three topics for all stakeholders. Zero-Trust data sharing schemas are generated either from an existing data array or defined data schema. The process involves reading an array of data value elements having a defined structure of a collection of data value elements which are each identified by at least one array index or key, then generating a new Zero-Trust data sharing schema from the array of data value elements, organized and stored in their original formats with each identified by at least one array index or key, in which the original data value elements are correspondingly paired with a new self-governing data security element. An alternative process can be performed by reading a normalized schema of a data store or database that defines its entities, the format or structure of each and the relationship among them, and then generating a new Zero-Trust data sharing schema from the array of data value elements, organized and stored in their original formats with each identified by at least one array index or key, in which the original data value elements are correspondingly paired with a new self-governing data security element. The Self-Governing data security mechanism provides a method by which the Publisher can override the default need-to-know value of any self-governing data security element for any data cell. This override is accomplished by Publishers by appending to any data value within any published data array or record, a need-to-know value tagged or encoding within a text snippet of a predetermined type, such as a "{ }", that substitutes within the Self-Governing key-value tuples the default need-to-know value normally inherited from the Zero-Trust Data Sharing schema with the encoded value inserted by the Publisher.

According to FIG. 1, a system architectural view 100 of the present invention in the preferred embodiments is provided. The figure depicts a system comprised of software code, configuration files, file systems, data operating systems, key-value stores, distributed data access and query engines, and associated workers and coordinators thereto, in addition to various microservices which are stored in a security container 108, which is a lightweight, standalone, executable package of software that includes everything needed to run the system without any direct user interfaces to the system, its code, libraries, settings or the data stored within it. Such a container has no direct user interfaces, provides no user privileges, has no centralized authority to access any component within the security container, and which uses decentralized microservices to operate the functions within the software security container, including the basic read, write and delete functions of the key-value store, organized in such a manner as to prevent the any user of the software security container from using the key-value store within it to view, extract or make use of the stored Self-Governing key-value tuples. According to various embodiments, securely containerized software can reside on physical or virtual servers, or clusters of same controlled by Linux or similar operating systems. With each embodiment, the option exists for the present invention to function as a marketplace when deployed on public clouds 102, a private marketplace or service when deployed on a private cloud 104 or as a product when deployed on private Linux clusters 106, where the public cloud, private cloud or linux clusters are configured without root-user access, where root is the user name or account that by default has access to all commands and files on a Linux or other Unix-like operating system. The system or platform functionality may be co-located or various parts/components may be separately and run as distinct functions, in one or more locations (over a distributed network).

The software is fully encapsulated within a security container 108, which in the preferred embodiment is an enhanced version of a Docker container with direct user access removed, preventing direct access to the key-value store by any user, within which are an array of software components, including a distributed file system 110, which in the preferred environment is Apache Hadoop, that provides high-performance access to data distributed across many computing clusters, a distributed data operating and resource management system 112, which in the preferred environment is a deployment of Apache Yarn and Zookeeper, that allows multiple data processing engines to handle data stored within the system, two separate data storage and processing cores, each of which is an environment for specific data driven workflows that use the Self-Governing data provided by Publishers. The first sandbox data core 114 is a key-value data store, which in the preferred embodiment is Apache Accumulo, for sample data provided by Publishers to provide widely used data sandbox functions for exploration, analytic modeling, testing and validation. The second secure data core 118, which in the preferred embodiment is Apache Accumulo, used in the present invention a key-value data store for sensitive source data sets commingled from a plurality of Publishers. The sandbox data core 114 is enhanced with a spatio-temporal indexing engine 116 for indexing of spatial, temporal and spatio-temporal data. Similarly, the secure data core 118 is enhanced with a spatio-temporal indexing engine 120 for indexing of spatial, temporal and spatio-temporal data. In the preferred embodiment, the spatio-temporal indexing engine 116, 120 can be either Eclipse GeoMesa or Eclipse GeoWave, either of which manages geo-time data within key-value data stores to enable spatio-temporal data to be indexed and queried effectively. An in-memory distributed data access and query engine 122, which in the preferred embodiments can be Apache Spark or Apache Presto, enables for local or distributed analytics, machine learning or AI. A distributed data access worker 124, which in the preferred embodiment is Apache Presto, is a software service to communicate for in-memory read and write data to and from local or remotely located key-value stores, in particular, and other types of data stores and databases, in general. These microservices are configured able to replicate the read, write and delete functions of a key-value store, including the ability to publish Self-Governing key-value tuples into the key-value store into one or more tables within the key-value store using a model of named vertical columns and horizontal rows matching the formats within Zero-Trust data sharing schema, wherein the received the received Self-Governing key-value tuples from multiple data sources are commingled within the table corresponding to the Zero-Trust data sharing schema in use. A distributed data access coordinator 126 is a software service to determine which local or remotely located key-value stores should be addressed when the system is deployed in a distributed network in more than one location.

The software is operated via decentralized microservices powered by a microservices engine 134 which empowers multiple parties to make their own independent decisions, and wherein there is no single centralized authority that makes decisions on behalf of any or all the parties. The parties of the present invention are users performing the roles of Publisher or Subscriber or Administrator. The present invention, in various embodiments, is a secure decentralized containerized system of Zero-Trust microservices, which enable functional workflows for Publishers to securely share sensitive data for a shared purpose without exposing said data in a manner that violates each Publisher's rules and policies, for Subscribers to make use of shared data, based on explicit permission and need-to-know entitlements granted, or denied, to each Subscriber separately, and for Administrators to perform functions to maintain the system and provide common services to Publishers and Subscribers. Publishers exclusively access system functions in a unidirectional, write-only modality via Publisher Services Endpoints 146 which are application programming interfaces, provided as a microweb service located at internet accessible endpoints. Similarly, Administrators exclusively access system functions via Administrative Services Endpoints 148 which are application programming interfaces, provided as a microweb service located at internet accessible endpoints. The respective services endpoints 146, 148 are the only points of user interaction with the system.

The respective services endpoints 146, 148, interact with User Verification Services 150, which is a set of stored instructions residing in one or many non-transitory computer-readable storage mediums, that, when executed by a plurality of processors within one of the public clouds 102, private cloud 104 or private Linux clusters 106, cause the User Verification Services 150 running within the system to compare the presented Publisher or Administrator user credentials to those stored credential attributes to Publishers or Administrators already defined in the system.

An Administrator account is defined during the instantiation of the system when deployed within one of the public clouds 102, private cloud 104 or private Linux clusters 106. Administrators, once so verified, can access User Admin Services 138, a set of decentralized microweb services that enable Administrators to create, edit and delete system user account profiles for Publishers and Subscribers that stored their credential attributes in the system. Administrators can access Container Admin Services 136, a set of decentralized microweb services that enable Administrators to manage system functions, compute and storage resources, and stop or start microservices.

Administrators can access the Zero-trust Schema Catalog Manager 140, a set of decentralized microweb services that enable Administrators to ingest and update Zero-Trust data sharing schemas, which are used to define what data sets are to be shared by Publishers and provide a mechanism by which each Publisher can control how and by whom and for what purpose each data element can be used. A Zero-Trust data sharing schema can be created from an array of data value elements having a defined structure of a collection of data value elements which are each identified by at least one array index or key. Each element in the array of data value elements is of type string, number, object, array, boolean or null and may be all of the above, plus other expressions, functions, dates, and undefined. Alternatively, it can be created a normalized schema of a data store or database that defines its entities, the format or structure of each and the relationship among them. The Zero-Trust data sharing schema is generated from a previously read array of data value elements or from the normalized schema of a data store, where Zero-Trust data sharing schema pairs a data value elements with a corresponding Self-Governing data security element The Self-Governing data security element can be of type string, number, object, array, or boolean, that stores for a row, column or cell of data the security or visibility policy defined by the owner of said data element.

The ingestion or update of Zero-Trust data sharing schemas can only be affected via microservices 134 either by file importation via URL, or via internet browser file upload. According to various embodiments, Zero-Trust data sharing schemas in the Catalog Manager 140, may contain specific formats for each value, including formats for numerical data, text data, time series data, geospatial data, spatio-temporal data, and spatial and other data types oriented around non-geographic systems including but not limited to human organs, molecular structures and genetic sequences. Zero-Trust data sharing schemas in the Catalog Manager 140 may be formatted as Tab Separated Value Files, Comma Separated Value Files, Json Arrays, Geojason Arrays, Avro Formats, or other forms of packets. Each Zero-Trust data sharing schemas in the Catalog Manager 140 has two record fields for each data element to be shared. The first element is the "data value element" which contains the value of the record from the source publishing system that is the value of the data element itself. The second element is the "Self-Governing security data element" which is applied to that published data-value-element cell. The Self-Governing security data element stores one fine-grained need-to-know control value used to determine how and by whom and for what purpose each data element can be used.

In a practical implementation, Publishers are verified by the system, though not required. Publishers, once so verified, can access Publisher Data Ingest Services 144, a set of decentralized microweb services that enable Publishers to securely accept properly formatted data sets into the system, rejecting any others which are not properly formatted, after the instantiation and deployment of the system within one of the public clouds 102, private cloud 104 or private Linux clusters 106. Publisher Data Ingest Services 144 interacts with the Catalog Manager 140 and the Microservices Engine 134 to receive a plurality of data streams each associated with one or a plurality of diverse distributed data sources, each a Publishing System. It is first determined, by automated inspection of the Published Data Set, if the Publisher is submitting a data set which contains the same data value elements formatted to match the specified and corresponding Zero-Trust data sharing schema expressed by the Publisher to the Publisher Data Ingest Services 144. If not matching, the attempted deposit is rejected. If matching, it is determined by automated inspection if the Publisher is submitting a data value elements in an acceptable format, matching the specified Zero-Trust data sharing schema expressed by the Publisher to the Publisher Data Ingest Services 144. The deposited data stream is accepted into the Dedicated Publisher Virtual Dropboxes 128, which function like a unix domain socket or inter-process communication socket (IPC socket) to exchange and encrypt data in a reliable stream of bytes in a real time process orchestrated by the Automated Data Routing, Transformation and System Mediation Engine 130. The Automated Data Routing, Transformation and System Mediation Engine 130 allows the Publishing Systems to interact with the system to receive, route, transform, and sort data, as needed, in an automated and configurable manner. It first reads each data-value element in the Published Data Set in memory and pairs to it the corresponding "Self-Governing security data element" to be applied to that published data-value-element in key-value pair to be stored either in the second secure data core 118 or the sandbox data core 114. Based on how the Publisher expressed to the Publisher Data Ingest Services 144 determines where the data is to be deposited. If the data-value-element is spatio-temporal data, it will be automatically indexed via the spatio-temporal indexing engine 120, 116, resulting in the Self-Governing security data element becoming the need-to know control value to function as a visibility policy of the data-value-element (a data cell) in a single key-value pair, whereby the visibility policy can be used by the system to determine how and by whom and for what purpose each data element can be used. Every step in the process is recorded by the Logging And Metering Engine 132 produced in a text log of these outcomes or deposits log entries in a designated database with time and date stamps Publishers can access Publisher Entitlement Services 142, a set of decentralized microweb services that enable Publishers to interact with Subscribers to receive, grant or deny access to specific published "Self-Governing" data sets in a process. If permission is granted, the Publisher can assign a "need-to-know" entitlement to the approved Subscriber for any particular data set or all data sets, processed into the system and stored in a designated database. This controls access to data in the sandbox data core, whereby that control is affected by the system to determine if any particular data-value-element is visible to the Subscriber. Additionally, Publishers, via Publisher Entitlement Services 142, can allow Subscribers to execute specific analytic routines, machine learning algorithms, or artificial intelligence processes, or any other data process (collectively data usage) that reads the specific published "Self-Governing" data sets in a process. This controls access to data in the secure data core, whereby that control is affected by the system to determine if any particular data-value-element is visible to the Subscriber's data usage process, to allow Subscribers of the system to engage in analytics, machine learning and artificial intelligence (AI) or other permitted data usage processes only in an indirect manner via analytic or machine learning microservices created using the Microservice Engines 134. This prevents any direct access, exposure or extraction to or of any data in the secure core key-value store 118 by any user, so that in no event can any user of the system indirectly expose real sensitive data in contradiction to or violation of the visibility settings of the key-value pairs, the value of the visibility setting being the corresponding Self-Governing security data element assigned by the Publisher, either by default or by override in the manner described above.

According to various embodiments, the value of each Self-Governing security data element is either applied by default by the invention during publishing, or by the Publisher's override of the said default need-to-know value, the combination of which is comprises the Self-Governing data security mechanism of the invention. Publishers are provided with a normative or scalar range of fine-grained need-to-know control values that can be applied to each and every data element in each published data set that are each associated with the Publisher's rules governing by whom, how and when and for what purposes separately published and subsequently commingled data element can be used. In any range, the least restrictive need-to-know control value provides open access to any user to that element, and the most restrictive need-to-know control values prevents usage by any user. The value of each Self-Governing security data element which a particular Publisher uses to override the default values in the Zero-Trust data sharing schema, can be applied by inserting the need-to-know value as a encoded tag or text snippet to the data-value-element itself during the publishing process. Such tags or text snippets are consistently formatted using predefined text characters or symbols, an example of which is "{" or "}", that are used to demarcate the need-to-know value. These tags or text snippets can be applied by each Publisher to one or many data fields, rows or columns.

Figure 2:
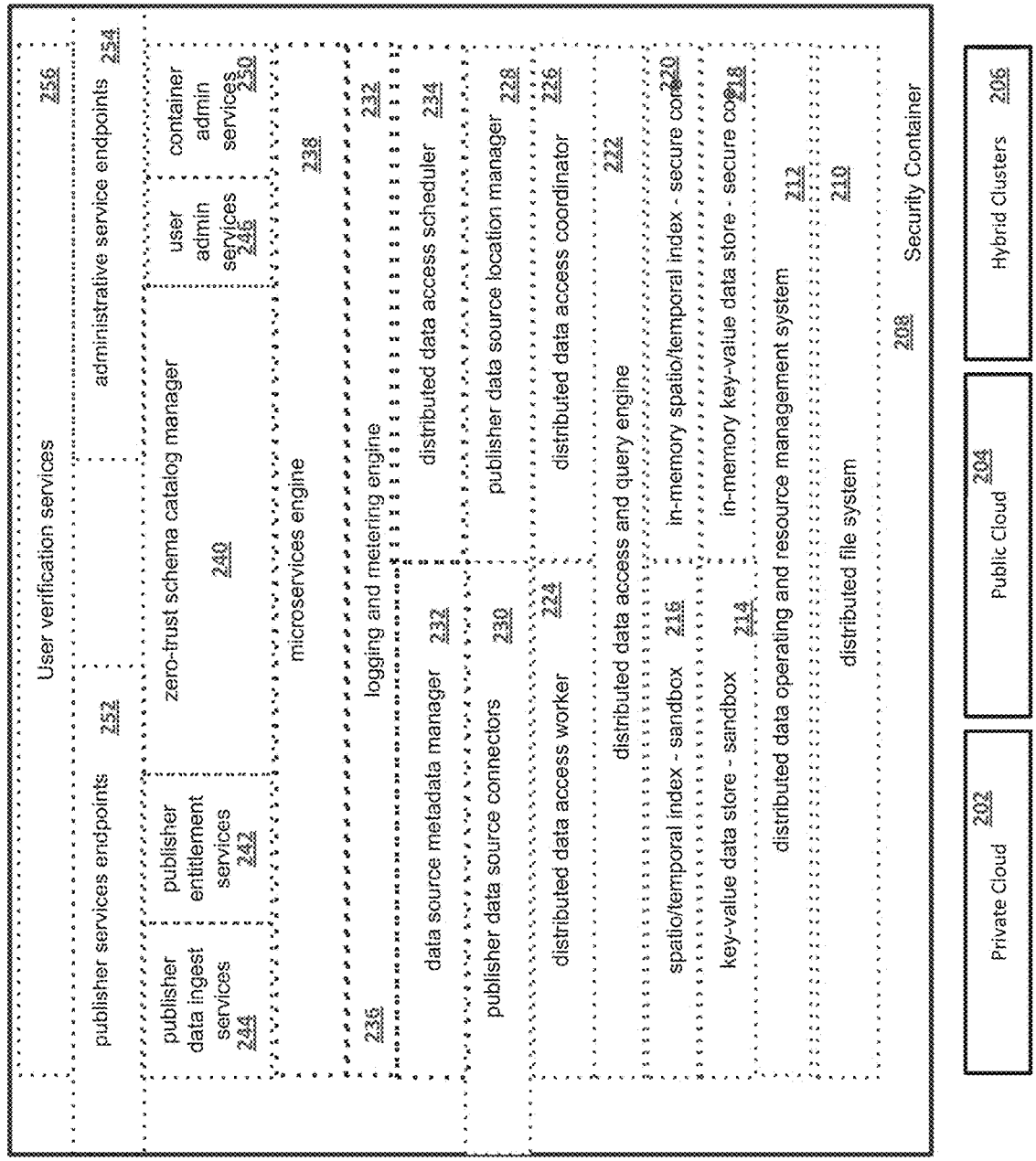
FIG. 2 depicts a second software technology architecture to enable a multitude of unrelated organizations to directly collaborate in a manner whereby each can separately enable access to data residing in an external system, in-place, and in its native format, where "Self-Governing" data sets which are generated virtually in-memory, without moving or altering the native format of the shared data, but enabling the logical commingling of "Self-Governing data sets" for secure analytic, machine learning and artificial intelligence (AI) or other permitted data usage processes, wherein a set of decentralized services enable a plurality of Publishers to separately and simultaneously define, embed and enforce granular security policies on each data element, to each effect control over how and by whom and in what context each data element can be used in such a way as to make the resultant data "Self-Governing".

According to FIG. 2, a system architectural view 200 of the present invention in an alternative embodiments is provided. In some cases, the volume of data to be shared and commingled may be too large, or the data may be perceived as too sensitive, to duplicate and move. The architecture 200 of the alternative embodiments allows for the source data sets to remain in place, in their original formats, where the data sharing and commingling is performed in a virtualized, in-memory process that may be ephemeral The figure depicts a system, comprised of software code, configuration files, file systems, data operating systems, key-value stores, distributed data access and query engines, and associated workers and coordinators thereto, in addition to various microservices which are stored in a security container 208, which is a lightweight, standalone, executable package of software that includes everything needed to run the system without any direct user interfaces to the system, its code, libraries, settings or the data stored within it. According to various embodiments, securely containerized software can reside on physical or virtual servers, or clusters of same controlled by Linux or similar operating systems. With each embodiment, the option exists for the present invention to function as a marketplace when deployed on public clouds 202, a private marketplace or service when deployed on a private cloud 204 or as a product when deployed on private Linux clusters 206, where the public cloud, private cloud or linux clusters are configured without root-user access, where root is the user name or account that by default has access to all commands and files on a Linux or other Unix-like operating system. The system or platform functionality may be co-located or various parts/components may be separately and run as distinct functions, in one or more locations (over a distributed network).

The system 200 in the alternative embodiment, can be used to perform secure Zero-Trust data sharing and commingling through a set of decentralized microservices in a manner that allows the data to be either locally stored or remotely accessed in the distributed Publishing System, leaving the data in-place and in its native formats, where the data sharing and commingling operations are performed in-memory, The software is fully encapsulated within a security container 208, which in the preferred embodiment is an enhanced version of a Docker container with direct user access removed, preventing direct access to the key-value store by any user, within which are an array of software components, including a distributed file system 210, which in the preferred environment is Apache Hadoop, that provides high-performance access to data distributed across many computing clusters, a distributed data operating and resource management system 212, which in the preferred environment is a deployment of Apache Yarn and Zookeeper, that allows multiple data processing engines to handle data stored either within the system or in-place in the source Publishing System where data remains in its native format and is not moved or extracted. The first sandbox data core 214 is a local key-value data store, residing within the system 200 which in the preferred embodiment is Apache Accumulo, for sample data provided by Publishers to provide widely used data sandbox functions for exploration, analytic modeling, testing and validation. The second secure in-memory data core 218, which in the preferred embodiment is Apache Presto, functions as a virtual in-memory key-value data store for sensitive source data sets commingled in-memory from a plurality of Publishers. The sandbox data core 214 is enhanced with a secure spatio-temporal indexing engine 216. The system 200 can be configured where the secure in-memory data core 218 or the underlying distributed file system 210 can be enhanced with an in-memory spatio-temporal indexing engine 220 for indexing of spatial, temporal and spatio-temporal data. In the preferred embodiments, the spatio-temporal indexing engine 216, 220 can be either Eclipse GeoMesa or Eclipse GeoWave, either of which manages geo-time data within key-value data stores to enable spatio-temporal data to be indexed and queried effectively, where data residing in-place is spatially indexed in the source Publishing System 212. An in-memory distributed data access and query engine 222, which in the preferred embodiments can be Apache Presto, enables for local or distributed analytics, machine learning or AI. A Distributed Data Access Coordinator 226 is a software service to coordinate the functions of the location manager 228, the worker(s) 224, and the scheduler 234, along with the data source metadata manager 232, the Publisher data source location manager 228, are in the preferred embodiment distributed components of Apache Presto. A Publisher Data Source Location Manager 228 is a software service to determine which remotely located Publishing System or local key-value stores should be addressed when a validated and approved user request to make use of the data stored with the Publishing System is initiated. Distributed Data Access Workers 224 are software services that manage the interactions with and communication to and from the Publishing Systems or local key-value stores, via the Publisher Data Source Connectors 226, to perform in-memory read and write functions. These microservices are configured able to replicate the read, write and delete functions of a key-value store, including the ability to publish Self-Governing key-value tuples into one or more table within the key-value store using a model of named vertical columns and horizontal rows matching the formats within Zero-Trust data sharing schema, wherein the received the received Self-Governing key-value tuples from multiple data sources are commingled within the table corresponding to the Zero-Trust data sharing schema in use. The Publisher Data Source Connectors 230 are bi-directional software services that exclusively interact with the Publishing System based on instructions issued by the Distributed Data Access Workers 224, where the workers 224 read the native metadata schemas from the source system data stores, then stored in the Data Source Metadata Manager 232, to enable in-memory usage and security transformations of the data elements residing in place, and in its native format, within each Publishing System, where such usage may include Publisher approved queries or other Publisher approved operations, without replicating or moving said data . . . . A Distributed Data Access Scheduler 234 performs distributed, decentralized data access pipeline design and execution, assigns work to the closest worker 224, issuing instructions through the connectors 226 and monitoring progress for the Distributed Data Access Coordinator 226

The software is operated via decentralized microservices powered by a microservices engine 238, which empowers multiple parties to make their own independent decisions, and wherein there is no single centralized authority that makes decisions on behalf of any or all the parties. The parties of the present invention are users performing the roles of Publisher or Subscriber or Administrator. The present invention, in various embodiments, is a secure decentralized containerized system of Zero-Trust microservices, which enable functional workflows to provide functionality for Publishers to securely share sensitive data for a shared purpose without exposing said data in a manner that violates each Publisher's rules and policies, for Subscribers to make use of shared data, based on explicit permission and need-to-know entitlements granted, or denied, to each Subscriber separately, and for Administrators who perform functions to maintain the system and provide common services to Publishers and Subscribers. Publishers exclusively access system functions in a write-only modality via Publisher Services Endpoints 252 which are application programming interfaces, provided as a microweb service located at internet accessible endpoints. Similarly, Administrators exclusively access system functions via Administrative Services Endpoints 254 which also are application programming interfaces, provided as a microweb service located at internet accessible endpoints. The respective services endpoints 252, 254 are the only points of user interaction with the system. The respective services endpoints 252, 254, interact with User Verification Services 256, which is a set of stored instructions residing in one or many non-transitory computer-readable storage mediums, that, when executed by a plurality of processors within one of the public clouds 202, private cloud 204 or private Linux clusters 206, cause the User Verification Service 256 running within the system to compare the presented Publisher or Administrator user credentials to those stored credential attributes to Publishers or Administrators already defined in the system.

An Administrator account is defined during the instantiation of the system when deployed within one of the public clouds 202, private cloud 204 or private Linux clusters 206. Administrators, once so verified, can access User Admin Services 246, a set of decentralized microweb services that enable Administrators to create, edit and delete system user account profiles for Publishers and Subscribers that stored their credential attributes in the system. Administrators, once so verified, can access Container Admin Services 250, a set of decentralized microweb services that enable Administrators to managed system functions, compute and storage resources, and stop or start microservices.

Administrators can access the Zero-trust Schema Catalog Manager 240, a set of decentralized microweb services that enable Administrators to ingest and update Zero-trust Data Sharing Schemas, which are used to define what data sets are to be shared by Publishers and provide a mechanism by which each Publisher can control how and by whom and for what purpose each data element can be used. A Zero-Trust data sharing schema can be created from an array of data value elements having a defined structure of a collection of data value elements which are each identified by at least one array index or key. Each element in the array of data value elements is of type string, number, object, array, boolean or null and may be all of the above, plus other expressions, functions, dates, and undefined. Alternatively, it can be created a normalized schema of a data store or database that defines its entities, the format or structure of each and the relationship among them. The Zero-Trust data sharing schema is generated from a previously read array of data value elements or from the normalized schema of a data store, where Zero-Trust data sharing schema pairs a data value elements with a corresponding Self-Governing data security element The Self-Governing data security element can be of type string, number, object, array, or boolean, that stores for a row, column or cell of data the security or visibility policy defined by the owner of said data element.

The ingestion or update of Zero-trust Data Sharing Schemas can only be affected via microservices 238 either by file importation via URL, or via internet browser file upload. According to various embodiments, Zero-Trust data sharing schemas in the Catalog Manager 240, may contain specific formats for each value, including formats for numerical data, text data, time series data, geospatial data, spatio-temporal data, and spatial and other data types oriented around non-geographic systems including but not limited to human organs, molecular structures and genetic sequences. Zero-Trust data sharing schemas in the Catalog Manager 240, may be formatted as Tab Separated Value Files, Comma Separated Value Files, Json Arrays, Geojason Arrays, Avro Formats, or other forms of packets. Each Zero-Trust data sharing schemas in the Catalog Manager 240 has two record fields for each data element to be shared. The first element is "data value element" which contains the value of the record from the source publishing system that is the value of the data element itself. The second element is the "Self-Governing security data element" to be applied to that published data-value-element cell. The Self-Governing security data element stores one fine-grained need-to-know control value used to determine how and by whom and for what purpose each data element can be used.

In a practical implementation, Publishers are verified by the system, though not required. Publishers, once so verified, can access Publisher Data Ingest Services 244, a set of decentralized microweb services that enable Publishers to securely accept properly formatted data sets into the system, rejecting any others which are not properly formatted, into the sandbox data core 214 within the system after the instantiation and deployment of the system within one of the public clouds 202, private cloud 204 or private Linux clusters 206. The Publisher Data Ingest Services 244 interacts with the Catalog Manager 240 and the Microservices Engine 238 to receive a plurality of data streams each associated with one or a plurality of diverse distributed data sources, each a Publishing System. It is first determined, by automated inspection of the Published Data Set, if the Publisher is submitting a data set which contains the same data value elements formatted to match the specified and corresponding Zero-trust Data Sharing Schema expressed by the Publisher to the Publisher Data Ingest Services 244. If not, the attempted deposit is rejected. If matching, it is determined by automated inspection if the Publisher is submitting a data value elements in an acceptable format, matching the specified Zero-Trust data sharing schema expressed by the Publisher to the Publisher Data Ingest Services 244. The Distributed Data Access Coordinator 226 allows the system 200 to interact with the Publishing System to receive, route, transform, and sort data in-memory, leaving the source data in place in its native format, as needed, in an automated and configurable manner. It first reads each data-value element Published Data Set in memory and pairs to it the corresponding "Self-governing Security Data Element" to be applied to that published data-value-element in key-value pair to be stored in the Sandbox Data Core 214. Based on how the Publisher expressed to the Publisher Data Ingest Services 244 determines where the data is to be deposited. If the data-value-element is spatio-temporal data, it will be automatically indexed via the spatio-temporal indexing engine 216, resulting in the Self-Governing security data element becoming the need-to know control value to function as a visibility policy of the data-value-element (a data cell) in a single key-value pair, whereby the visibility policy can be used by the system to determine how and by whom and for what purpose each data element can be used. Every step in the process is recorded by the Logging and Metering Engine 232 produced in a text log of these outcomes or deposits log entries in a designated database with time and date stamps.

Publishers, once so verified, can enable secure remote access to the Publishing Systems via Publisher Data Source Connectors 230 allowing the system to access source raw data sets in-place via the in-memory the Secure Data Core 218 within the system after the instantiation and deployment of the System 200 within one of the public clouds 202, private cloud 204 or private Linux clusters 206 The Distributed Data Access Coordinator 226 interacts with the Publisher Data Source Location Manager 228 to determine where the data resides, with the Distributed Data Access Worker 224 to securely communicate directly with the Publishing System. The Publisher Data Source Connector 230 reads into memory data in its native format as stored by the data source Metadata Manager 232. This triggers an interaction with the Microservices Engine 238 to read the Zero-Trust Data Sharing Schemas stored in the Catalog Manager 240 and finding that which is mapped, linked or associated with the source data in the Data Source Metadata Manager 232 to pair in memory the corresponding "Self-governing Security Data Element" to the corresponding published data-value-element in a set of key-value pairs to be stored in the In-Memory Key-Value Store 218. This results in the Self-Governing security data element becoming the need-to know control value to function as a visibility policy of the data-value-element in a single key-value pair, whereby the visibility policy can be used by the System 200 to determine how and by whom and for what purpose each data element can be used. Every step in the process is recorded by the Logging and Metering Engine 232 produced in a text log of these outcomes or deposits log entries in a designated database with time and date stamps.

Publishers can access Publisher Entitlement Services 242, a set of decentralized microweb services that enable Publishers to interact with Subscribers to receive, grant or deny access to specific published "Self-Governing" data sets in a process. If permission is granted, the Publisher can assign a "need-to-know" entitlement to the approved Subscriber for any particular data set or all data sets, processed into the System and stored in a designated database. This controls access to data in the sandbox data core, whereby that control is affected by the System to determine if any particular data-value-element is visible to the Subscriber. Additionally, Publishers, via the Publisher Entitlement Services 242, can allow Subscribers to execute specific analytic routines, machine learning algorithms, or artificial intelligence processes, or any other data process (collectively data usage) that read the specific published "Self-Governing" data sets in a process. This allows the Publisher to assign a "need-to-know" entitlement to the approved Subscriber data usage for any particular data set or all data sets, processed into the System 200 and stored in a designated database. This controls access to data in the secure data core, whereby that control is affected by the System 200 to determine if any particular data-value-element is visible to the Subscriber's data usage process, to allow Subscribers of the system to engage in analytics, machine learning and artificial intelligence (AI) or other permitted data usage processes only in an indirect manner via analytic or machine learning microservices created using the Microservice Engines 238. This prevents any direct access, exposure or extraction to or of any data in the In-memory Secure Core Key-value Store 218 by any user, so that in no event can any user of the system indirectly expose real sensitive data in contradiction to or violation of the visibility settings of the key-value pairs, the value of the visibility setting being the corresponding Self-Governing security data element assigned by the Publisher, either by default or by override in the manner described above.

According to various embodiments, the value of each Self-Governing security data element is either applied by default by the invention during remote access reading in memory, or by the Publisher's override of the said default need-to-know value in the source Publishing system, the combination of which is comprises the Self-Governing data security mechanism of the invention. Publishers are provided with a normative or scalar range of fine-grained need-to-know control values that can be applied to each and every data element in each data set that are each associated with the Publisher's rules governing by whom, how and when and for what purposes separately published and subsequently commingled data element can be used. In any range, the least restrictive need-to-know control value provides open access to any user to that element, and the most restrictive need-to-know control values prevents usage by any user. The value of each Self-Governing security data element which a particular Publisher uses to override the default values in the Zero-Trust data sharing schema, can be applied by inserting the need-to-know value as a encoded tag or text snippet to the data-value-element itself during the publishing process. Such tags or text snippets are consistently formatted using predefined text characters or symbols, an example of which is "{" or "}", that are used to demarcate the need-to-know value. These tags or text snippets can be applied by each Publisher to one or many data fields, rows or columns.

Figure 3:
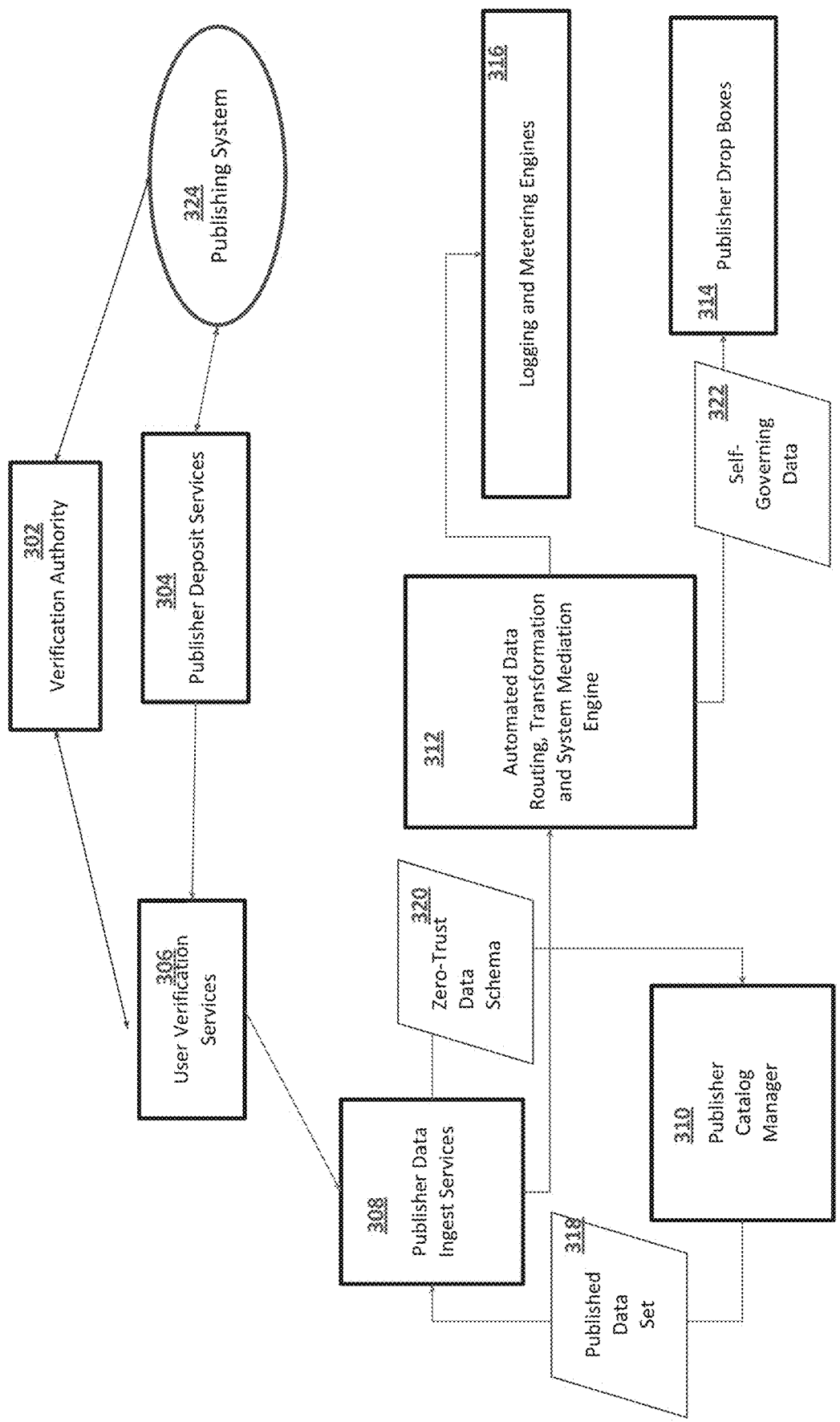
FIG. 3 depicts a process flow by which the first architecture in FIG. 1 is used by a plurality of Publishers each of which separately define, embed and enforce granular security policies on each data element.

As depicted in FIG. 3, a process 300 performed by the present invention for Publishers using the system architecture 100 is provided. The process securely deposits data sets for combinatorial analytics, machine learning or artificial intelligence (AI) or other permitted data usage processes in a manner that does not expose the deposited data to direct user access or allow misuse in violation of the Self-Governing security need-to-know rules applied by each Publisher and enforced by the system.

According to various embodiments, the Publisher 324 can be a system, such as an Hospital Information Management system, Electronic Medical Records System, an ERP or CRM system, a consumer banking transaction system, an automated log processing system, any form of internet of things or industrial internet of things system or any transactional system, enterprise data warehouse, data lake, database, or data repository or streaming data service, which contains data to be published, either in batch or streaming modes. The data publishing process flow initiates with a call by the Publisher 324 to the Publisher Deposit Services 304 located at internet accessible secure encrypted endpoints. The User Verification Service 306 relies on a set of stored instructions residing in one or many non-transitory computer-readable storage mediums, that, when executed, compares the presented credentials of the Publisher 324 requesting access to the Publisher Deposit Services 304 to those stored credential attributes associated with all Publishers already defined in the system and identifies the Publisher. The identity of the requesting Publisher can be verified by the configured Verification Authority 302 to allow or deny access to the Publisher, for example via bidirectional SSL/TLS authentication. If confirmed the datasource is labeled with a unique identifier. The Automated Data Routing, Transformation and System Mediation Engine 312 conducts the Publisher Data Ingest Services 308 to determine what data set is being deposited and in which key-value store or related table of such key-value pairs or tuples, where tuples are unordered sets of known values with names, the resultant processed data-value-elements are to be stored. Once determined, the Publisher Deposit Services 304 receives a data stream, read into memory, of data-value-elements, the Published Data Set 318 of data-value-elements from the Publisher 324. The data may be formatted as including, but not limited to, Tab Separated Value Files, Comma Separated Value Files, Json Arrays, Geojason Arrays, Avro Formats, or other forms of packets, which may contain specific formats for each value, including formats for numerical data, text data, time series data, geospatial data, spatio-temporal data, and spatial and other data types, any element (cell, column or row, or groups of cells) of which is tagged with text snippets consistently formatted using predefined text characters or symbols. In the preferred embodiment, the text snippets are contained within curved-pointed bracket characters "{" or "}" that are used to demarcate the Self-Governing data security value within the aforementioned normative or scalar range of fine-grained control need-to-know control values. These are applied by exception to the default Self-Governing data security values, which are fine-grained need-to-know control values on the established normative or scalar range. Such specific fine-grained control values will be applied to those specific data-value element in each published data set that define for each the visibility, or need-to-know rules governing by whom, how and when and for what purposes separately published and subsequently commingled data can be used. In any range, the least restrictive value limit of control provides open access to any user to that element, and the most restrictive limit means no usage or access can be provided to any user. This triggers selections of data that when executed cause the Publisher Data Ingest Services 308 and Catalog Manager 310 to interact to inspect Published Data Set 318 and accepting compliant deposits and rejecting those which are not compliant with the predefined Zero-Trust data sharing schema 320 specified in the initial call by the Publisher 324 to the Publisher Deposit Services. The data can be parsed into data cells each data element in their original format as it is being read. Afterwards, the Automated Data Routing, Transformation and System Mediation Engine 312 conducts the Publisher Data Ingest Services 308 to process the data-value-element streaming into the Publisher's dropbox 314 for automated data processing and storage as Self-Governing key-value tuples 322 with each data-value-element linked to the assigned Self-Governing data security value. This is done to ensure that each data-value-element is stored in a key-value tuple with the identity of its Publisher 324 linked to the Self-Governing data security value stored as the visibility setting for that data-value-element 322, to govern the required need-to-know entitlement that is required by the Subscriber to gain as permission from the Publisher 324 to make use of that data-value-element for analytics, machine learning or artificial intelligence (AI) or other permitted data usage processes. Every step and action in this entire process is captured by the Logging and Metering Engine 316 to record those outcomes of successful and failed data ingestion with time and date stamps.

Figure 4:
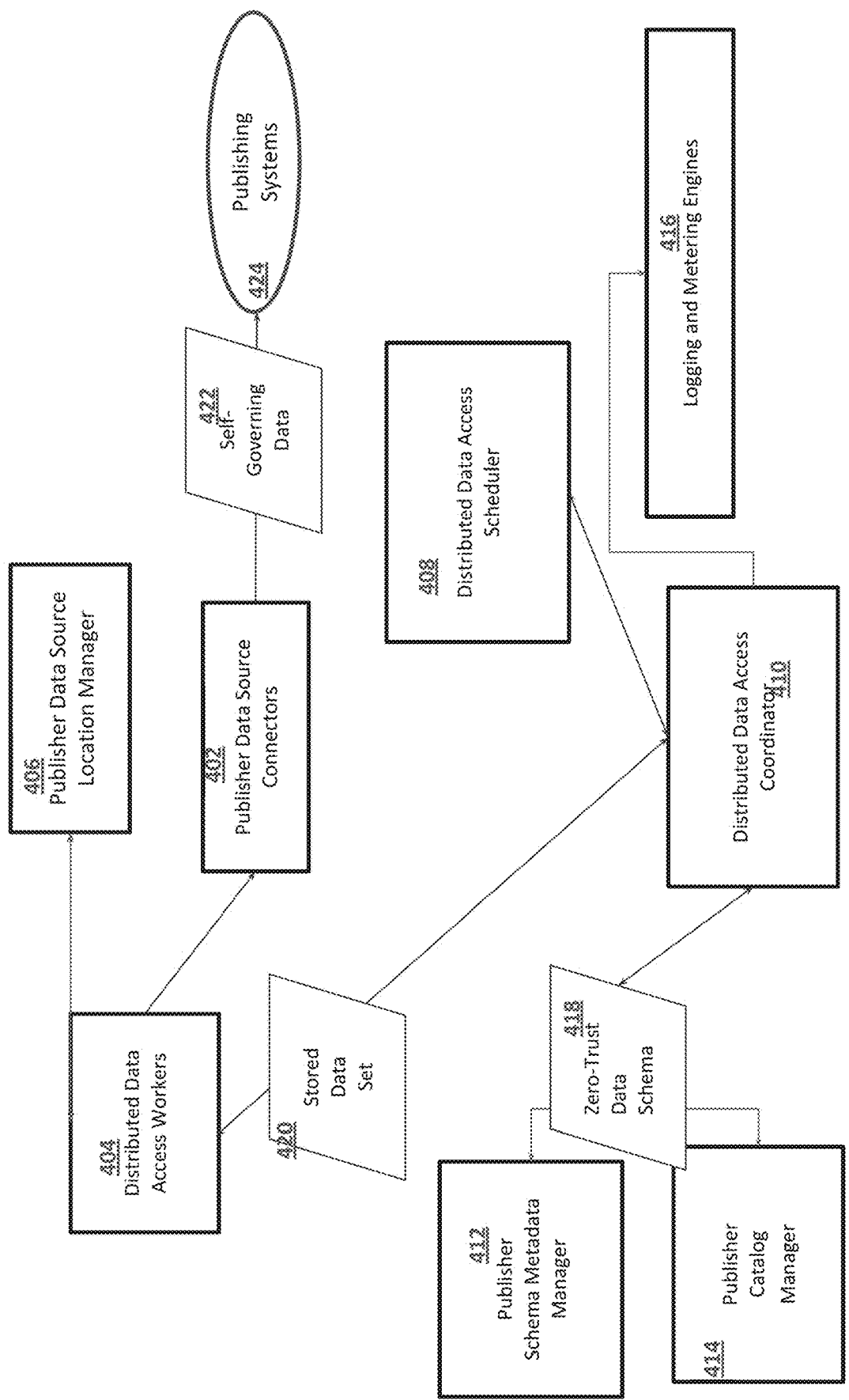
FIG. 4 depicts a process flow by which the second architecture in FIG. 2 is used by a plurality of Publishers each of which separately define, embed and enforce granular security policies on each data element to be used separately or in combination in-memory without moving or altering the native format of the shared data.

As depicted in FIG. 4, a process 400 performed by the present invention for Publishers 424 using the system architecture 200 is provided. The process securely accesses data sets stored locally within the system 200 or remotely, in-place and in its native format in the Publishing System 424 for combinatorial analytics, machine learning or artificial intelligence (AI) or other permitted data usage processes in a manner that does not expose the deposited data to direct user access or allow misuse in violation of the Self-Governing security need-to-know rules applied by each Publisher and enforced by the System.

According to various embodiments, the Publisher 424 can be a system, such as an Hospital Information Management system, Electronic Medical Records System, an ERP or CRM system, a consumer banking transaction system, an automated log processing system, any form of internet of things or industrial internet of things system or any transactional system, enterprise data warehouse, data lake, database, or data repository or streaming data service, which contains data to be published, either in batch or streaming modes. One or more Distributed Data Access Worker(s) 404 are configured to communicate with each Publishing System 424 passing instructions and performing communications with the Publishing System 424 via the Publisher Data Source Connectors 402 A validated authorized user of the System 200 initiates a request to use shared commingled data that triggers a remote in-memory data access process flow orchestrated by the Distributed Data Access Coordinator 410 to commingle and then make use of Self-Governing data tuples 422 which entails the in-memory transformation of one or many Stored Data Sets 420 within the Publishing System 424. A process is executed by the Distributed Data Access Coordinator 410, which calls on the Distributed Access Scheduler 408 to instantiate an in-memory data pipeline to access and commingle the requested Self-Governing data sets 422 for previously authorized and validated productive use. The Distributed Data Access Coordinator 410, interacts with the Distributed Access Scheduler 408 to determine which Distributed Data Access Workers 404 will be activated to perform data transformation operations in situations where the same data set may reside in more than one Publishing System 424, based on information residing in the Publisher Data Source Location Manager 406 so as to determine in which data repository the requested sources data are mostly closely located. The Distributed Data Access Coordinator 410, assigns to the selected Distributed Data Access Workers 404 in-memory data pipeline activities and transformations designated by the Distributed Access Scheduler 408. The Distributed Data Access Coordinator 410 next interacts with the Publisher Schema Metadata Manager 412, which stores the native data schema of data sets 420 residing within each connected Publishing System 424, and the Publisher Data Catalog Manager 414, which stores the Zero-Trust data sharing schema 418 associated with each stored data set 420, to determine how the assigned workers 404 transform in-memory each with each stored data set 420 to make it Self-Governing 422 for the approved data usage request made by the validated authorized user of the System 200. Stored data sets 420 may be formatted in a variety of ways including, but not limited to, Tab Separated Value Files, Comma Separated Value Files, Json Arrays, Geojason Arrays, Avro Formats, or other forms of packets. The Distributed Data Access Coordinator 410, assigns to the selected Distributed Data Access Workers 404 in-memory data transformation tasks to generate the correct arrays of Self-Governing key-value tuples 422 in memory, indexing each for spatio-temporal usage as needed. The aforementioned data transformation process pairs a data value elements with a corresponding Self-Governing data security element, and where Self-Governing data security elements are values that describe the security or visibility policy of a data value as defined by its Publisher 424 in such a manner that enables the Self-Governing data security element to be used by the approved validated user only in the manner that user has been explicitly permitted by each Publisher 424. Each Self-Governing key-value tuple generated in this process contains at minimum the cellular value of the data value element in the stored data set 420 as defined in the Publisher Schema Metadata Manager 412, its corresponding Self-Governing data security element value stored as the visibility policy for that tuple, as determined by the default values within the Zero-Trust data sharing schema 418 in use, the unique identifier of the Publishing System 424 in use for that data value element, and the datetime of the creation of the tuple. The Self-Governing data security element value stored as the visibility policy of the Self-Governing key-value tuples 422 generated in-memory by this process are used control the need-to-know governing by whom, how and when and for what purposes every commingled Self-Governing key-value tuples 422 can be used for analytics, machine learning or artificial intelligence (AI) or other permitted data usage processes. Every step and action in this entire process is captured by the Logging and Metering Engine 416 to record those outcomes of successful and failed data access with time and date stamps.

Figure 5:
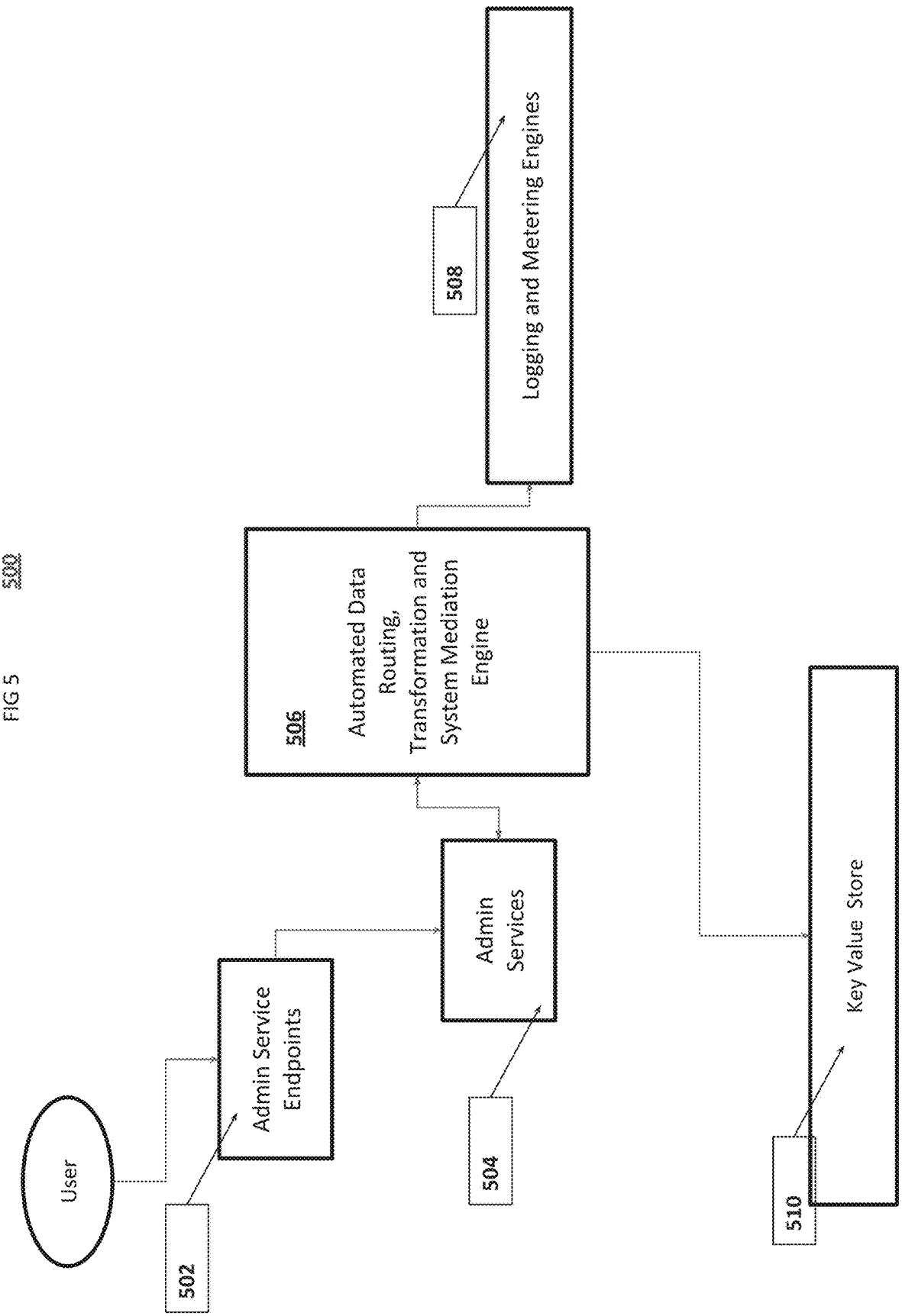
FIG. 5 depicts a process flow by which the architecture in FIG. 1 or FIG. 2 enables each administrators to creates and manage the identities and profiles of Publishers and Subscribers.

As depicted in FIG. 5, a process 500 performed by the present invention for Administrators using the system is provided. The process enables validated and authorized administrators to access Admin Services 504 via Admin Service Endpoints 502. If confirmed, a process conducted by the Automated Data Routing, Transformation and System Mediation Engine 506, creates and manages the identities of Publishers and Subscribers and service providers through the creation of records stored as new key-value pair into a set of dedicated administration-related key-value store 510 where the Logging and Metering Engine 512 logs those outcomes with time and date stamps.

Figure 6:
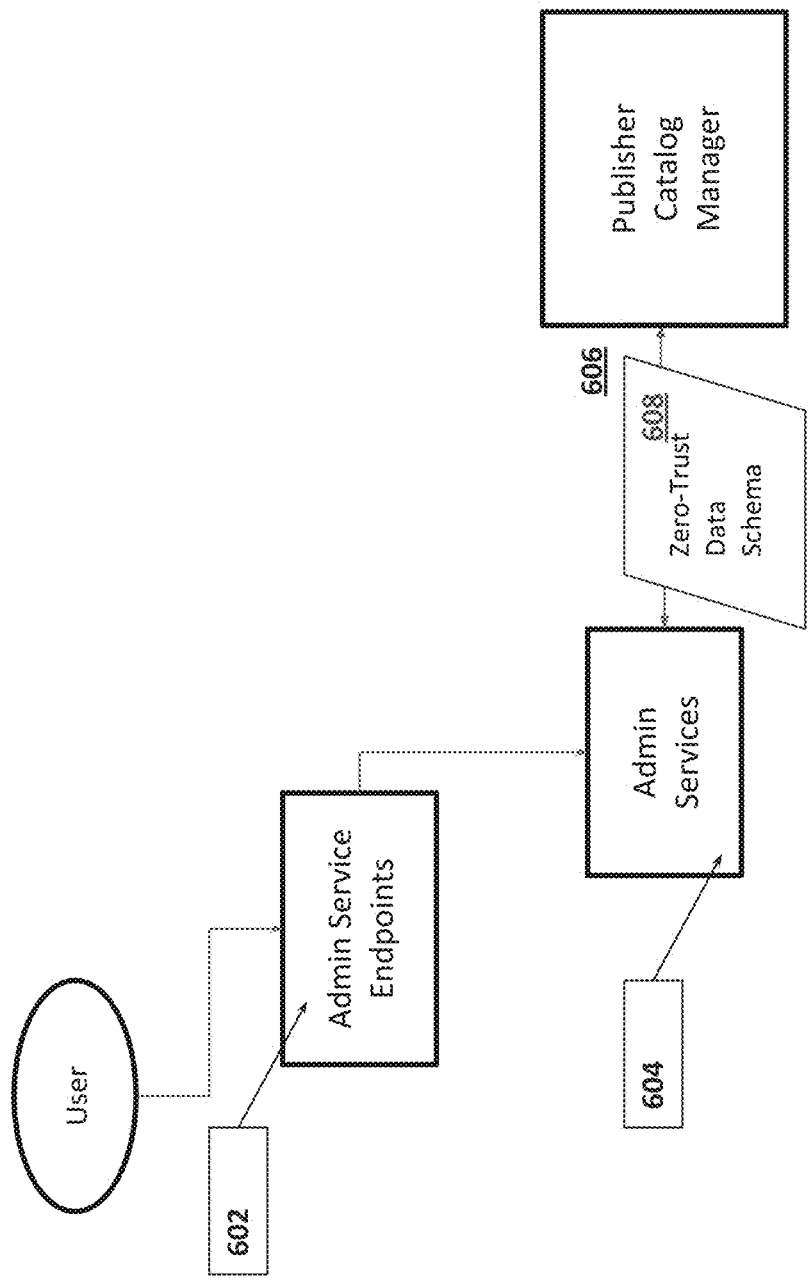
FIG. 6 depicts a process flow by the architecture in in FIG. 1 or FIG. 2 enables administrators to add new or remove unwanted Zero-Trust data sharing schemas, which are used to define, embed and enforce fine-grained control over how and by whom and in what context each data element can be used when it is virtually or physically commingled to meet the requirements s.

As depicted in FIG. 6, a process 600 performed by the present invention for Administrators using the system is provided. The process enables validated and authorized administrators to access Admin Services 604 via Admin Service Endpoints 602 providing the capability to insert additional Zero-Trust data sharing schemas 608 in the Catalog Manager 606 for Publishers to use when making data accessible for combinatorial analytics or machine learning or artificial intelligence (AI) or other permitted data usage processes.

As depicted in FIG. 7, an illustrative example 700 of how a Publisher can define and embed granular Self-Governing data security values on each data-value-element within various systems 100, 200 and by various processes 300, 400 and enforce those assignments in the key-value store, is provided. This example describes how the present invention is used to assign Self-Governing data security values into the key-value pair or tuple of its linked data-value-element and then commingle those elements—here taking the form of highly sensitive and private patient medical test results—from many sources so that it can then be analyzed to improve patient outcomes. The laboratory results for two tests—Hemoglobin A1c and HIV-1—for patient Roger Jones with medical record number 12559111, as it may be found in the database tables within an Electronic Health Record (EHR) system of a hospital or clinic 702. In this example, the EHR is described in this system as "Publisher 1245", and the clinic is described as "Beachnut". The target Zero-Trust data sharing schema for this type of published data set within the system is tab separated value (TSV) and the administrator of Publisher 1245 transforms the required data fields into a publishable format 704 to match the target Zero-Trust data sharing schema in the Catalog Manager as described above, adding fields (e.g. Publisher ID) and tagging each data-value-element (e.g. data cell) with a fine-grained Self-Governing data security control value by exception. In this example, the normative scale has five tiers in order of least to most restriction. "All" equals open access. "RES_1" is level one restriction and is the default level of restrictiveness for this schema (meaning RES_1 is auto assigned by the system by default to every cell that otherwise do not have a tag containing its fine-grained control value). "RES_2" is heightened restriction. "RES_3" is highest restriction. Lastly, "NIL" is blocked to all parties. The administrator of Publisher 1245 applies logic to the transformation when reformatting this data to apply RES_2 restrictions to the patient's last name and date of birth, and because HIV-1 results are very private, those results regardless of outcome are tagged with RES_3. These values are displayed in an exploded view 706 that shows the Test Result Column of elements carrying the default RES_1 security tag, which is auto applied to the Hemoglobin A1c whereas the higher RES_3 security tag is applied to the results for the HIV-1 test. During the process of the published data by the processes described herein, many key-value pairs are created from each record. Key Structures are a 5-tuple 708, as such there will be many keys created for analytic routines in any deployment of the present invention. In the present example, two such key-value pairs are created, one each for the lab result from the Hemoglobin A1c test whereas the higher RES_3 security tag is applied to the results for the HIV-1 test 710 where for each key-value pair the most restrictive fine-grained control value that the Publisher assigned any included data element (cell) is inherited to the entire key-value pair containing those elements.

The preceding description contains embodiments of the invention and no limitation of the scope is thereby intended. It will be further apparent to those skilled in the art that various modifications and variations can be made in the present invention without departing from the spirit or scope of the invention.

That which is claimed is:

1. A system supporting operations on securely commingling Self-Governing data sets from a plurality of Publishers, comprising at least one processor, the at least one processor configured to cause the system to perform:
    storing, organizing and commingling Self-Governing data tuples that contain at least a data element cell value, a Publishers assigned Self-Governing data security element value, a unique identifier of the Publisher, and a datetime stamp;
    blocking direct user access to any Self-Governing data or Analytic Services during and after deposit into the system;
    blocking direct view of or access to any data cell in ways which violate cell-level Need-to-Know policies contained for every data element in every Self-Governing Data set;
    executing Analytics Services operations on the commingled data without exposing any data cell to any system user;
    separating access to results of the Analytic Services from the commingled Self-Governing data sets based on their Zero-Trust Self-Governing visibility policies immutably and persistently applied to the Self-Governing data at the data cell level.

2. The system of claim 1, wherein processor is configured to cause the system to further perform:
    defining and managing specific Self-Governing Data schemas and inspection services that Publishers can utilize to securely deposit Self-Governing data.

3. The system of claim 1, wherein processor is configured to cause the system to further perform:
    validating that Self-Governing Data sets match at least one Self-Governing Data schema.

4. The system of claim 1, wherein processor is configured to cause the system to further perform:
    providing to Service Providers the use of developer tools to create and test Analytic Services using Publisher provided sample or synthetic Self-Governing data that matches one or more Self-Governing Data Schemas.

5. The system of claim 1, wherein processor is configured to cause the system to further perform:
    allowing Service Providers to submit Analytic Services for Publisher inspection and approval to use Publisher's Self-Governing data subject to the Zero-Trust data security element value each Publisher applied to each data value in each tuple.

6. The system of claim 1, wherein processor is configured to cause the system to further perform:
    creating and providing user credentials for all non-administrative system users.

7. The system of claim 1, wherein processor is configured to cause the system to further perform:
    defining and managing a catalog of Self-Governing Data schemas.

8. The system of claim 1, wherein processor is configured to cause the system to further perform:
    logging and analyzing usage of data owned by each Publisher needed to deliver the results of the Analytic Services to Subscribers.

9. The system of claim 1, wherein processor is configured to cause the system to further perform:
    resetting or deleting environment data and logs.

10. The system of claim 1, wherein processor is configured to cause the system to further perform
    enforcing access rules to the sample or synthetic data contained within an Analytic Sandbox.

11. A system supporting operations on securely commingling Self-Governing data sets from a plurality of Publishers, comprising at least one processor, the at least one processor configured to cause the system to perform:

virtually accessing, organizing and commingling Self-Governing data tuples that contain at least a data element cell value, a Publishers assigned Self-Governing data security element value, a unique identifier of the Publisher, and a datetime stamp;

blocking direct user access to any Self-Governing data or Analytic Services during and after deposit into the system;

blocking direct view of or access to any data cell in ways which violate cell-level Need-to-Know policies contained for every data element in every Self-Governing Data set;

executing Analytics Services operations on the commingled data without exposing any data cell to any system user;

separating access to results of the Analytic Services from the commingled Self-Governing data sets based on their Zero-Trust Self-Governing visibility policies immutably and persistently applied to the Self-Governing data at the data cell level.

12. The system of claim 11, wherein processor is configured to cause the system to further perform:

defining and managing specific Self-Governing Data schemas and inspection services that Publishers can utilize to securely enable virtualized access to Self-Governing data.

13. The system of claim 11, wherein processor is configured to cause the system to further perform:

validating that Self-Governing Data sets match at least one Self-Governing Data schema.

14. The system of claim 11, wherein processor is configured to cause the system to further perform:

providing to Service Providers a distinct testing environment for the creation and testing Analytic Services, that isolates the execution of pre-approved Analytic Services from another environment or repository used for the execution of approved Analytics Services, where the distinct testing environment enables the use of developer tools to create and test Analytic Services using Publisher provided sample or synthetic Self-Governing data that matches one or more Self-Governing Data Schemas.

15. The system of claim 11, wherein processor is configured to cause the system to further perform:

allowing Service Providers to submit Analytic Services for Publisher inspection and approval to use of Publisher's Self-Governing data, in a distinct testing environment subject to the Zero-Trust data security element value each Publisher applied to each data value in each tuple.

16. The system of claim 11, wherein processor is configured to cause the system to further perform:

creating and providing user credentials for all non-administrative system users.

17. The system of claim 11, wherein processor is configured to cause the system to further perform:

defining and managing a catalog of Self-Governing Data schemas.

18. The system of claim 11, wherein processor is configured to cause the system to further perform:

logging and analyzing usage of data owned by each Publisher needed to deliver the results of the Analytic Services to Subscribers.

19. The system of claim 11, wherein processor is configured to cause the system to further perform:

resetting or deleting environment data and logs.

20. The system of claim 11, wherein processor is configured to cause the system to further perform:

enforcing Self-Governing Data access rules in a distinct testing environment to the sample or synthetic data contained within the distinct testing environment.

* * * * *